(12) United States Patent
Perrott

(10) Patent No.: US 6,367,751 B1
(45) Date of Patent: Apr. 9, 2002

(54) BRACKET ASSEMBLY

(75) Inventor: J. Donald Perrott, Oshawa (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/638,006

(22) Filed: Aug. 14, 2000

(51) Int. Cl.[7] .............................................. B60G 15/06
(52) U.S. Cl. ................... 248/218.4; 248/230.1
(58) Field of Search ...................... 248/218.4, 230.1, 248/62; 403/384

(56) References Cited

U.S. PATENT DOCUMENTS 5,170,973 A * 12/1992 Ohta .......................... 248/230

* cited by examiner

Primary Examiner—Daniel P. Stodola
Assistant Examiner—Erica B. Harris
(74) Attorney, Agent, or Firm—Jeffrey A. Sedlar

(57) ABSTRACT

A bracket assembly including a first bracket assembly that includes an annular portion and a pair of opposing flange members extending outwardly from the annular portion so as to define an open center between the pair of opposing flange members, and a second bracket assembly that includes a back plate and two opposing sidewall members extending outwardly from the back plate. The second bracket assembly is received in the open center defined by the first bracket assembly, wherein the first bracket assembly includes an extended back portion that projects axially beyond the top edge of the back plate.

7 Claims, 2 Drawing Sheets

BRACKET ASSEMBLY

FIELD OF THE INVENTION

The present invention relates to a support bracket for automobiles. More particularly, the invention relates to a structurally improved bracket for use in automobile suspension systems.

BACKGROUND OF THE INVENTION

A conventional support system for coupling a strut type shock absorber to an automobile wheel assembly, as shown in FIG. 3, typically includes a knuckle bracket 1 including an outer bracket 2 and an inner bracket 3. The outer bracket 2 generally includes an annular portion 4 for receiving a tubular portion of a strut type shock absorber and a pair of opposing flanges 5a, 5b extending outwardly in parallel from the annular portion 4. The inner bracket 3 is inserted into the outer bracket 2 through an opening 6 formed between the flanges 5a, 5b, and includes a back portion 7 and opposing flanges 8a, 8b extending outwardly therefore so as to extend parallel with the flanges 5a, 5b. The inner bracket 3 is positioned in the outer bracket 2 such that through holes 9a, 9b formed in the flanges 5a, 5b align with through holes 9a, 9b formed in the flanges 8a, 8b. The brackets are then secured together by inserting a fastener such as a bolt through the through holes 9a, 9b.

When assembled, the outer bracket 2 and the inner bracket 1 form a substantially tubular through hole into which the tubular strut type shock absorber is inserted.

In many vehicle suspension strut designs, the strut type shock absorber is supported at its upper end by a top mount affixed to a mounting tower in the vehicle body work while the lower end of the strut is operatively connected to the knuckle bracket. This construction results in the strut type shock absorber being laterally offset from the wheel spindle and, thus, causes a bending moment, resulting in the development of binding stress along the tubular member. The maximum stress point is often located at that portion of the tubular member fitted into the lower end of the knuckle bracket and decreases to zero over the length of the tubular member.

One such system is described in U.S. Pat. No. 5,308,032 ("the '032 patent"), which discloses a knuckle bracket having an outer bracket and an inner bracket. The outer bracket includes an annular portion and a pair of clamp portions extending in parallel from the annular portion, and the inner bracket includes a bent backrest portion and a pair of support pieces extending in parallel from the backrest portion. The support pieces of the inner bracket are inserted between the clamp portions of the outer bracket, and a reinforcing bracket is provided at least between the support pieces of the inner bracket.

A similar system is described in U.S. Pat. No. 4,491,339 ("the '339 patent"). Again, the knuckle bracket assembly includes a multi-component device including an outer bracket and an inner bracket positioned within the outer bracket and arranged to help minimize the bending stresses developed along the strut type shock absorber.

SUMMARY OF THE INVENTION

This invention is of the general category of the above referenced '032 patent and the '339 patent, and more particularly is drawn to an improved bracket assembly for redistributing the bending stresses developed in a strut-type shock absorber. The bracket assembly can include a first bracket assembly that includes an annular portion supporting an extended back portion, and a pair of opposing flange members extending outwardly from the annular portion so as to define an open center between the pair of opposing flange members. The bracket assembly also includes a second bracket assembly that includes a back plate and two opposing sidewall members extending outwardly from the back plate. In the embodiment disclosed, the second bracket assembly is received in the open center defined by the first bracket assembly. In this arrangement, the extended back portion of the first bracket assembly projects axially beyond the top edge of the back plate. The flanges forming the opposing pair of flange members respectively overlie a sidewall member of the opposing sidewall members.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

The bracket assembly of the present invention generally includes a first bracket assembly having an annular member that includes an extended back portion. The first bracket assembly also includes a pair of opposing flange members that extend outwardly from both the annular member and the extended back portion.

In a preferred embodiment, the first bracket assembly has a U-shaped cross-section. However, one of skill in the art will appreciate that the first bracket assembly can be formed using a variety of other configurations.

The bracket assembly of the present invention further includes a second bracket assembly. The second bracket assembly includes a back plate and opposing sidewalls, and is received between the opposing flange members of the first bracket assembly. In this arrangement, the extended back portion of the annular member projects axially beyond the length of the back plate, and the opposing flange members overlie the sidewalls of the second bracket assembly so as to form a continuous flanged section.

Figure 1:
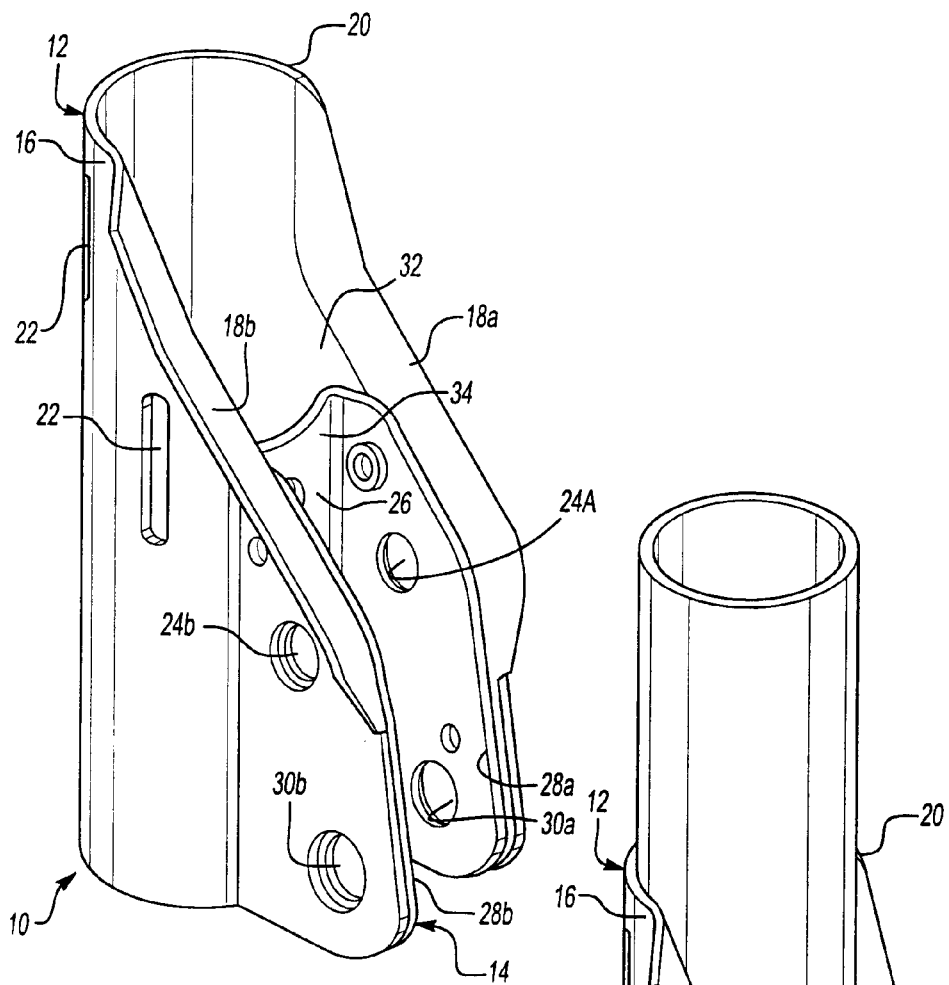
FIG. 1 shows a perspective view of a bracket assembly formed in accordance with the teachings of this invention.
Figure 2:
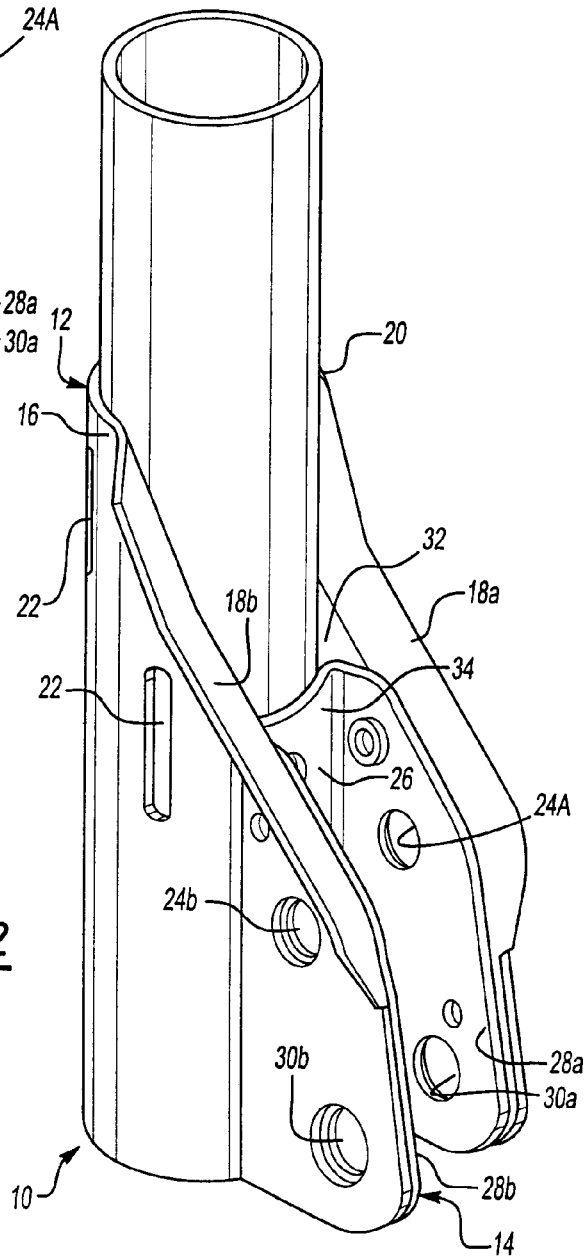
FIG. 2 shows a perspective view of the bracket assembly of FIG. 1 with a tubular member assembled within the bracket.
Figure 3:
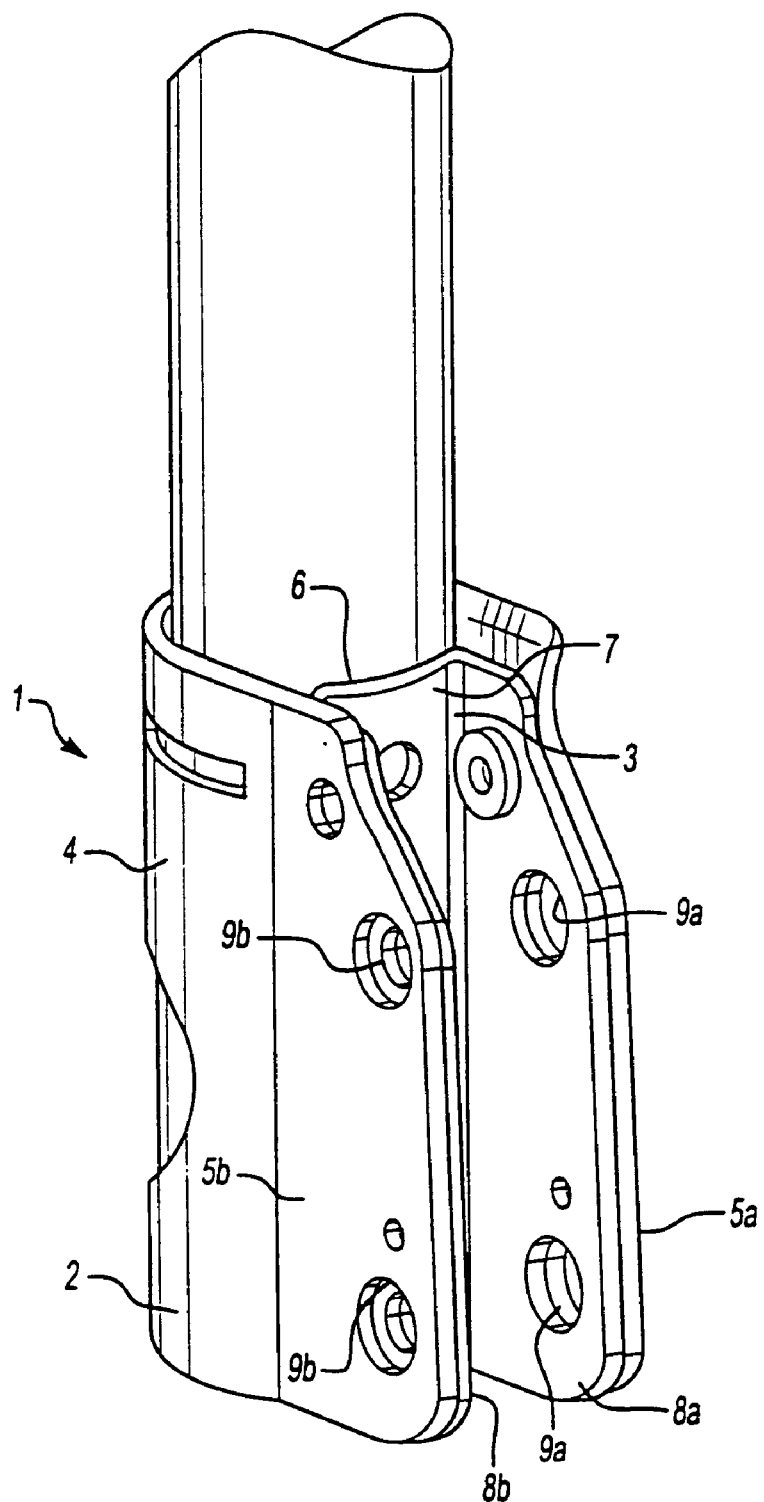
FIG. 3 shows a perspective view of a prior art bracket assembly.

FIG. 1 shows a bracket assembly 10 formed in accordance with the teachings of this invention. The bracket assembly 10 includes a first bracket assembly 12 and a second bracket assembly 14.

The first bracket assembly includes an annular portion 16 and opposing flanges 18a, 18b extending outwardly from the annular portion 16. The annular portion 16 includes an extended back portion 20, which can project axially upward from the annular portion 16. The annular portion 16 can also include one or more slots 22 that extend axially along the surface thereof.

The opposing flange members 18a, 18b define an open center therebetween. Each opposing flange member 18a, 18b also defines fitting holes 24a, 24b in the surface thereof. In one embodiment, a pair of fitting holes 24a, 24b are formed in axial alignment in the surface of each opposing flange member 18a, 18b. The fitting holes 24a, 24b of each opposing flange member 18a, 18b are also located in horizontal alignment.

The second bracket assembly 14 can include a back plate 26 and opposing sidewalls 28a, 28b, which extend outwardly from the periphery of the back plate 26. The sidewalls 28a, 28b can include a pair of axially aligned fitting holes 30a, 30b formed in each sidewall member 28a, 28b. The pair of fitting holes 30a, 30b formed in each sidewall member 28a, 28b is in horizontal alignment with the corresponding pair of fitting holes formed in the opposing sidewall members 28a, 28b.

The first and second bracket assemblies 12, 14 can be formed using known metal stamping techniques. In a preferred embodiment, the bracket assemblies 12, 14 are formed from stamped steel using generally known stamping techniques. One of skill in the art will appreciate that other fabrication techniques can be used, as well as other materials having sufficient structural and corrosion resistant properties.

ASSEMBLY OF THE BRACKET ASSEMBLY

As shown in FIG. 1, the second bracket assembly 14 is received between the opposing flange members 18a, 18b of the first bracket assembly 12 such that the assembly defines a through hole 32 running axially between the first and second bracket assemblies 12, 14. Additionally, the first and second bracket assemblies 12, 14 are positioned such that the extended back portion 20 of the first bracket assembly 12 projects axially beyond the length of a corresponding edge 34 of the back plate 26. And the opposing flange members 18a, 18b overlie the sidewalls 28a, 28b of the second bracket assembly 14 such that each flange member 18a, 18b extends from a point below an upper portion of the respective sidewall member 28a, 28b to a top edge of the extended back portion 20.

The design and assembly of the bracket assembly 10 is intended to redistribute the stress in the tubular member 36 and the means coupling the bracket assembly 10 and tubular member 36 for a given load. In the embodiment described, the continuation of the extended back portion 20 beyond the upper edge of the back plate 26 with overlying flanges 18a, 18b permits a gradual increase in section modulus with a corresponding reduction in stress in the tubular member, notably at the interface of the tubular member and the bracket assembly 10. As a result, the bracket assembly 10 may be suitable for use in heavy-duty applications or in vehicle applications utilizing a conventional strut system, wherein the total strut mass is reduced due to reduced material thickness of the strut and bracket 10.

What is claimed is:

1. A bracket assembly comprising:
a first bracket assembly including an annular portion that is at least partially annular about a central axis wherein the annular portion is configured for matingly receiving a cylindrical member with an outer annular surface and wherein the first bracket assembly includes;
i) an extended back portion of the annular portion configured for at least partially contacting the outer annular surface of the cylindrical member; and
ii) a pair of opposing flange members extending outwardly from the annular portion so as to define an open center between the pair of opposing flange members; and
a second bracket assembly including a back plate and two opposing sidewall members extending outwardly from the back plate, wherein;
i) the second bracket assembly is received in the open center defined by the first bracket assembly;
ii) the extended back portion of the first bracket assembly projects axially beyond a top edge of the back plate;
iii) the annular portion and the flange members of the first bracket assembly cooperatively slope angularly with respect to the central axis from the extended back portion to an area that is axially opposite the extended back portion relative to the top edge of the back plate; and
iv) the flange members overlie the opposing sidewall members.

2. A bracket assembly as in claim 1, wherein the annular portion and the flange members include lip portions that slope at the angle with respect to the central axis and wherein the lip portions are disposed generally perpendicular to the central axis.

3. The bracket assembly defined in claim 1, wherein the opposing flange members of the first bracket assembly and the opposing sidewall members of the second bracket assembly define through holes and wherein the through holes of the first bracket assembly align with the through holes of the second bracket assembly when the second bracket assembly is received in the first bracket assembly.

4. The bracket assembly defined in claim 1, wherein the annular portion of the first bracket assembly defines at least one axially extending slot through which access is provided to the outer annular surface of the cylindrical member when the cylindrical member is received within the annular portion thereby allowing the annular portion to be welded to the outer annular surface of the cylindrical member.

5. The bracket assembly defined in claim 1 wherein the first bracket assembly is coupled to the second bracket assembly.

6. The bracket assembly defined in claim 1, wherein the second bracket assembly is received in the open center between the pair of opposing flange members so as to define an axially extending opening between the first bracket assembly and the second assembly.

7. A bracket assembly comprising:
a first bracket assembly including an annular portion that is at least partially annular about a central axis wherein the annular portion is configured for matingly receiving a cylindrical member with an outer annular surface and wherein the first bracket assembly includes;
i) an extended back portion of the annular portion configured for at least partially contacting the outer annular surface of the cylindrical member; and
ii) a pair of opposing flange members extending outwardly from the annular portion so as to define an open center between the pair of opposing flange members wherein the annular portion and the flange members include lip portions that slope angularly with respect to the central axis, the lip portions disposed generally perpendicular to the central axis and wherein the annular portion of the first bracket assembly defines at least one axially extending slot through which access is provided to the outer annular surface of the cylindrical member when the cylindrical member is received within the annular portion for allowing the annular portion to be welded to the outer annular surface of the cylindrical member; and
a second bracket assembly including a back plate and two opposing sidewall members extending outwardly from the back plate, wherein;
i) the second bracket assembly is received in the open center defined by the first bracket assembly;

ii) the extended back portion of the first bracket assembly projects axially beyond a top edge of the back plate;

iii) the annular portion and the flange members of the first bracket assembly cooperatively slope angularly with respect to the central axis from the extended back portion to an area that is axially opposite the extended back portion relative to the top edge of the back plate; and iv) the flange members overlie the opposing sidewall members and the opposing flange members of the first bracket assembly and the opposing sidewall members of the second bracket assembly define through holes that align when the second bracket assembly is received in the first bracket assembly.

\* \* \* \* \*